(12) United States Patent
Herrmann et al.

(10) Patent No.: US 9,891,113 B2
(45) Date of Patent: Feb. 13, 2018

(54) THERMAL SENSOR AND METHOD FOR PRODUCING A THERMAL SENSOR

(71) Applicant: Robert Bosch GmbH, Stuttgart (DE)

(72) Inventors: Ingo Herrmann, Friolzheim (DE); Fabian Utermoehlen, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 176 days.

(21) Appl. No.: 14/914,285

(22) PCT Filed: Aug. 25, 2014

(86) PCT No.: PCT/EP2014/067986
§ 371 (c)(1),
(2) Date: Feb. 25, 2016

(87) PCT Pub. No.: WO2015/028419
PCT Pub. Date: Mar. 5, 2015

(65) Prior Publication Data
US 2016/0231178 A1 Aug. 11, 2016

(30) Foreign Application Priority Data
Aug. 26, 2013 (DE) ........................ 10 2013 216 909

(51) Int. Cl.
| *G01J 5/20* | (2006.01) |
| *G01J 5/14* | (2006.01) |
| *G01J 5/12* | (2006.01) |
| *G01J 5/00* | (2006.01) |
| *G01J 5/10* | (2006.01) |

(52) U.S. Cl.
CPC . *G01J 5/14* (2013.01); *G01J 5/12* (2013.01); *G01J 2005/0077* (2013.01); *G01J 2005/106* (2013.01); *G01J 2005/123* (2013.01)

(58) Field of Classification Search
CPC ......... G01J 5/20; G01J 5/08; H01L 27/14649; H01L 31/09; H04N 5/33
See application file for complete search history.

(56) References Cited

U.S. PATENT DOCUMENTS 4,558,342 A    12/1985    Sclar
4,903,106 A *   2/1990    Fukunaga ........... H01L 27/0211
                                                                                                257/378
(Continued)

OTHER PUBLICATIONS

International Search Report corresponding to PCT Application No. PCT/EP2014/067986, dated Nov. 21, 2014 (German and English language document) (7 pages).
(Continued)

*Primary Examiner* — David Porta
*Assistant Examiner* — Mamadou Faye
(74) *Attorney, Agent, or Firm* — Maginot, Moore & Beck LLP

(57) ABSTRACT

The present disclosure relates to a thermal sensor and a method for producing a thermal sensor of this type having a low signal-to-noise ratio at relatively high signal strengths. To this end, a thermoelectric generator is combined with a field effect transistor and a diode. Owing to its integrated diode and the barrier effect associated therewith, the thermal sensor is suitable for the economical and efficient design of imaging sensor arrays for converting thermal radiation into electrical signals.

8 Claims, 4 Drawing Sheets

(56) References Cited

U.S. PATENT DOCUMENTS 5,554,849 A 9/1996 Gates
2016/0139415 A1* 5/2016 Irzyk .................. G02B 27/0093
250/342

OTHER PUBLICATIONS

Galup-Montoro C, et al., Introductory ultra-low-voltage electronics, 2013 7th Argentine School of Micro-Nanoelectronics, Technology and Applications, Editorial de la Universidad Nacional del Sur, Aug. 15, 2013, pp. 1-8, XP032495627.
Schilz, Juergen, thermophysica minima Thermoelectric Infrared Sensors (Thermopiles) for Remote Temperature Measurements; Pyrometry, thermophysica minima, Jul. 11, 2000, pp. 1-12, XP055152950.
Kuphaldt T R, Lessons in Electric Circuits, vol. III Semiconductors, Jul. 2, 2007, pp. 1-14, XP002517561.

* cited by examiner

THERMAL SENSOR AND METHOD FOR PRODUCING A THERMAL SENSOR

This application is a 35 U.S.C. § 371 National Stage Application of PCT/EP2014/067986, filed on Aug. 25, 2014, which claims the benefit of priority to Serial No. DE 10 2013 216 909.4, filed on Aug. 26, 2013 in Germany, the disclosures of which are incorporated herein by reference in their entirety.

The present disclosure relates to a thermal sensor and a method for producing a thermal sensor. In particular, the present disclosure relates to a thermal sensor for providing a temperature-dependent output signal between a first and a second output.

For example, thermal diodes or thermocouples are known as sensor elements for detecting heat rays. For imaging detector systems, a two-dimensional array is used in which such detectors for heat radiation are arranged in a matrix made up of multiple rows and columns.

The publication U.S. Pat. No. 5,554,849 A discloses an array made up of thermal diodes for the two-dimensional detection of infrared radiation. Furthermore, a detector array is known from the publication U.S. Pat. No. 4,558,342 A, which uses thermocouples as detector elements. In order to increase the detector voltage, multiple thermocouples are connected in succession to so-called thermopiles.

When using thermal diodes in the imaging arrays, it is possible to form a matrix in which individual pixels may be addressed by applying suitable voltages to row and column conductors. To evaluate the corresponding pixels and to detect the temperature across the diode, the diode must be actively supplied with current. In numerous application cases, multiple such thermal diodes are connected per pixel in succession in order to increase the resolution capability.

On the other hand, thermocouples have the advantage that they generate a voltage directly from a temperature difference arising via the heat radiation. Unlike thermal diodes, it is therefore not necessary to actively supply the individual sensor elements with current. However, for evaluating the individual pixels of a sensor array, both terminals of the thermocouple must be connected to an evaluation circuit for each pixel.

Therefore, there is a need for a thermal element which makes an economical structure of large sensor arrays possible. Furthermore, there is a need for a thermal element having an improved signal-to-noise ratio. In addition, there is a need for a thermal element which is economical to produce.

According to a first aspect, the present disclosure provides a thermal sensor for providing a temperature-dependent output signal between a first and a second output, including a field-effect transistor which has a gate terminal, a source terminal, and a drain terminal; a diode which is connected to the drain terminal of the field-effect transistor via a connecting point and which is connected to the first output of the thermal sensor via an additional connecting point; and a thermoelectric generator which is designed to provide a temperature-dependent voltage between a first and a second connecting point, wherein the first connecting point of the thermoelectric generator is connected to the gate terminal of the field-effect transistor, and the second connecting point of the thermoelectric generator is connected to the source terminal of the field-effect transistor and the second output of the thermal sensor.

According to another aspect, the present disclosure provides a method for producing a thermal sensor which provides a temperature-dependent output signal between a first and a second output, including the steps of providing a field-effect transistor which has a gate terminal, a source terminal, and a drain terminal; providing a diode; providing a thermoelectric generator which is designed to provide a temperature-dependent voltage between a first and a second connecting point of the thermoelectric generator; connecting a connecting point of the diode to the drain terminal of the field-effect transistor; connecting an additional connecting point of the diode to the first output of the thermal sensor; connecting the first connecting point of the thermoelectric generator to the gate terminal of the field-effect transistor; and connecting the second connecting point of the thermoelectric generator to the source terminal of the field-effect transistor and the second output of the thermal sensor.

SUMMARY

The object of the present disclosure is to form a thermal sensor from a combination of a thermoelectric generator, for example, a thermocouple, and a field-effect transistor and a diode. In this case, the gate potential of the field-effect transistor is provided by the thermoelectric generator, whereby the field-effect transistor amplifies the temperature-dependent output signal of the thermoelectric generator. The field-effect transistor is in turn connected in series with a p-n diode which makes an electric current flow possible in one direction, while it blocks a current flow in the opposite direction.

The amplification of the thermal voltages of the thermoelectric generator by the field-effect transistor makes an output signal possible which is significantly higher in comparison to the output signal which would be achievable via a pure thermoelectric generator or a different temperature-dependent component without amplification.

The control of the thermal sensor is possible in a purely passive matrix via the series connection of the diode with the field-effect transistor. The individual thermal sensors in such a matrix may be addressed similarly to a sensor array made up of thermal diodes. In comparison to arrays including thermal diodes, an output signal having a significantly improved signal-to-noise ratio may be generated via the thermal sensor according to the present disclosure.

Due to the possibility of addressing the individual thermal sensors in a matrix individually, in addition, a two-dimensional sensor array may be formed via the thermal sensors according to the present disclosure in an efficient, space-saving manner, and thus also in an economical manner. Unlike conventional thermocouples, both terminals of each individual sensor element do not have to be contacted separately to an evaluation circuit.

According to another specific embodiment, the thermoelectric generator comprises a thermal element including at least two conducting paths made of materials having different Seebeck coefficients. A thermoelectric generator based on the Seebeck effect constitutes an efficient option for providing the required potential for the control of the gate terminal of the field-effect transistor.

According to one particular specific embodiment, the thermoelectric generator comprises a thermal pile including a plurality of thermal elements. Due to the series connection of multiple thermal elements, the voltage signal of the thermoelectric generator may be further increased, and the field-effect transistor may thus be particularly well controlled.

In an additional specific embodiment, at least the field-effect transistor and the first and second connecting points of the thermoelectric generator are arranged on a shared substrate. The combination of the field-effect transistor with the connecting points of the thermoelectric generator on a shared substrate makes a space-saving structure of the thermal sensor possible.

In an additional specific embodiment, the field-effect transistor, the first and second connecting points of the thermoelectric generator, and the diode are arranged on a shared substrate. As a result, a particularly efficient production of the thermal sensor is possible.

The present disclosure furthermore comprises a sensor array including a plurality of thermal sensors, wherein the plurality of thermal sensors is arranged in a matrix made up of rows and columns, and each thermal sensor of the plurality of thermal sensors is individually addressable. Thus, a sensor array for thermal radiation may be implemented which utilizes the advantages of the individual thermal sensors, in which the thermal sensors of the matrix are individually addressable, and which provides an output signal having high dynamics and a low signal-to-noise ratio in a small space.

Furthermore, the present disclosure comprises a camera including an aforementioned sensor array. Such a camera may, for example, be used for thermography applications or in a night-vision device.

Additional specific embodiments and advantages of the present disclosure result from the following detailed description in connection with the appended drawings.

DETAILED DESCRIPTION

Figure 1:
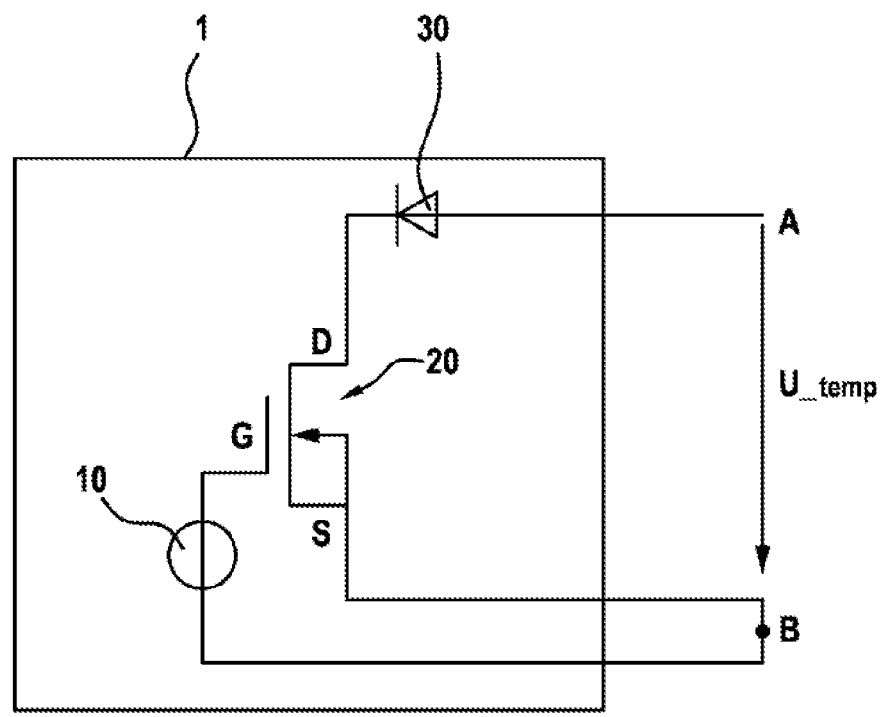
FIG. 1 shows a schematic representation of a circuit diagram of a thermal sensor according to one specific embodiment of the present disclosure.

FIG. 1 shows a circuit diagram of one possible specific embodiment of a thermal sensor 1. The thermal sensor 1 comprises a thermoelectric generator 10, a field-effect transistor (FET) 20, and a diode 30. Furthermore, the thermal sensor 1 includes two outputs A and B. The thermal sensor 1 provides a temperature-dependent output signal U_temp between these two outputs A and B. For this purpose, the thermal sensor 1 is actively supplied with current by an external source (not shown). The voltage drop U_temp thus generated between the outputs A and B is a function of the temperature difference which exists across the thermoelectric generator 10.

The thermoelectric generator 10 is, for example, a component which outputs a voltage as a function of a temperature between two connecting points. For example, the thermoelectric generator 10 may be a thermal element (thermocouple). Such thermal elements may, for example, be produced from two conducting paths made up of two materials having a different Seebeck coefficient. For example, aluminum and p-silicon, or n-silicon and p-silicon, are suitable as material combinations for this purpose. In addition, other material combinations are also conceivable.

If such a thermal element having at least two conducting paths made of two materials having different Seebeck coefficients is run from a heat sink to a heat source, a voltage difference arises between the two connecting points of the thermal element. This voltage difference may be used to control the FET 20. In addition, all other types of thermoelectric generators are also possible which output a defined voltage as a function of a temperature or a temperature difference.

The FET 20 comprises a source terminal S, a drain terminal D, and a gate terminal G. The thermoelectric generator 10 is connected to the gate terminal G of the FET 20 via a connecting point. From this connecting point, the thermoelectric generator 10 runs further to the source terminal S of the FET 20 via a terminal at the output B of the thermal sensor 1. The drain terminal D of the FET 20 is furthermore connected to a connecting point of the diode 30. The other connecting point of the diode 30 is connected to a connecting point at the other output A of the thermal sensor 1.

The thermoelectric generator 10 now generates a voltage difference between the source terminal S and the gate terminal G of the FET 20, which is a function of the temperature difference between the heat source and the heat sink at the thermoelectric generator 10. In the depicted example, this is approximately the temperature difference between the temperature at the FET 20 and the terminal B of the thermal sensor. In addition, for increasing the voltage difference, it is possible to implement so-called thermal piles in which multiple thermal elements (thermocouples) are connected in series. In this case, each thermal element of the thermal pile must be arranged between the heat source and the heat sink.

Figure 2:
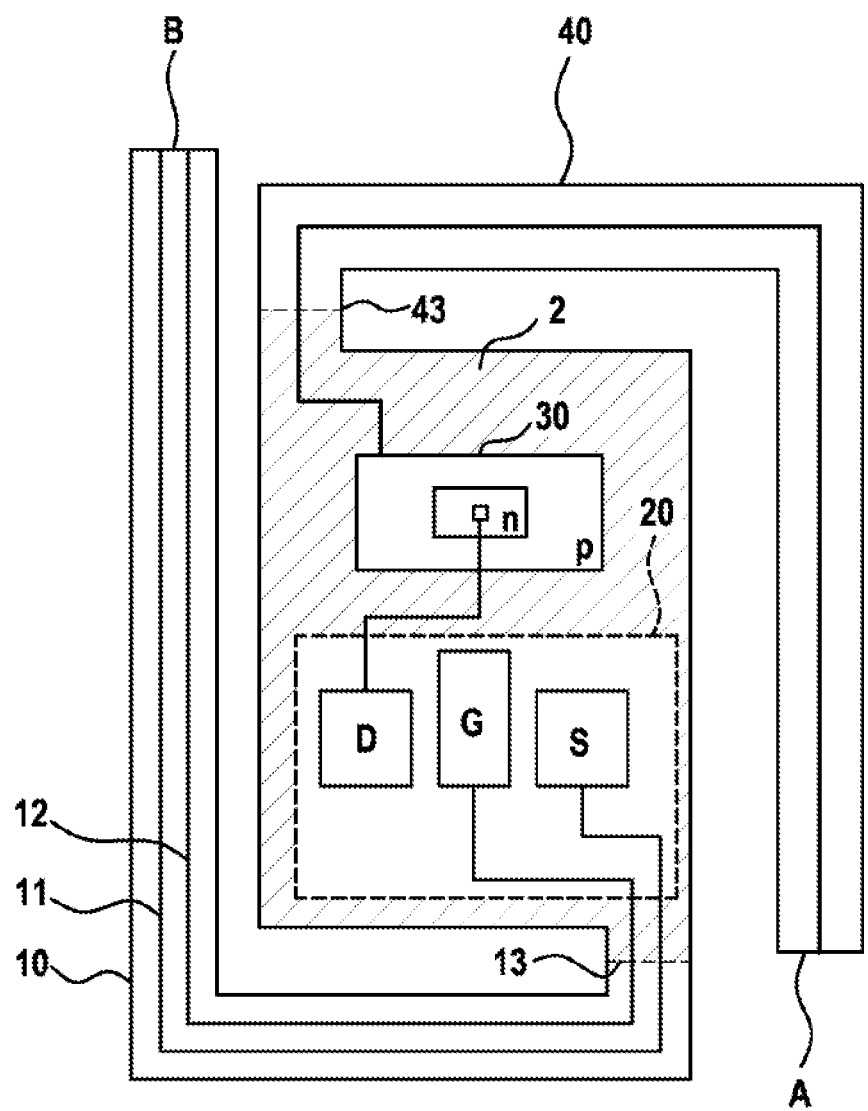
FIG. 2 shows a schematic representation of a top view onto a thermal sensor according to an additional specific embodiment of the present disclosure.

FIG. 2 shows a top view onto a thermal sensor 1 corresponding to the circuit diagram according to FIG. 1. The FET 20 and the diode 30 are arranged on a shared substrate 2. Furthermore, it is also possible that the FET 20 and the diode 30 are arranged on different substrates, or at least one of the structural components is also designed as a discrete structural component. The substrate 2 may, for example, be a micromechanically insulated silicon island. This silicon island may be suspended via thin supporting elements 13, 43. Simultaneously, the electrical contacting of the substrate 2 may also be carried out via these supporting elements 13 and 43. In the depicted case, the thermoelectric generator 10 is implemented from a series of two conducting paths 11 and 12 made of materials having different Seebeck coefficients. The first conducting path 11 runs from the source terminal S of the FET 30 to the connecting point at the output B of the thermal sensor 1. The second conducting path 12 runs in parallel with the first conducting path 11 from the connecting point at the output B of the thermal sensor 1 to the gate terminal G of the FET 3. As already mentioned, to increase the voltage signal, multiple thermal elements (thermocouples) may be connected in series.

A substrate 2 is, for example, a silicon island made of epitaxially grown silicon. The doping required for both the FET 20 and the diode 30 is preferably doped into this silicon island. Alternatively, instead of the silicon island, SOI (silicon on insulator) may be used. In this case, the doping for the FET 20 and the diode 30 must be introduced into the functional silicon layer of the SOI. The one connecting point of the diode 30 is connected to the first output A of the thermal sensor 1 via the feed line 40. The other connecting point of the diode 30 is connected to the drain terminal D of the FET 20. Thus, when current is actively applied between the two outputs A and B of the thermal sensor 1, an output signal U_temp is present whose magnitude varies as a function of the temperature difference between the substrate 2 and the temperature at the opposite point of the thermoelectric generator 10, i.e., in this case, the second output B.

Figure 3:
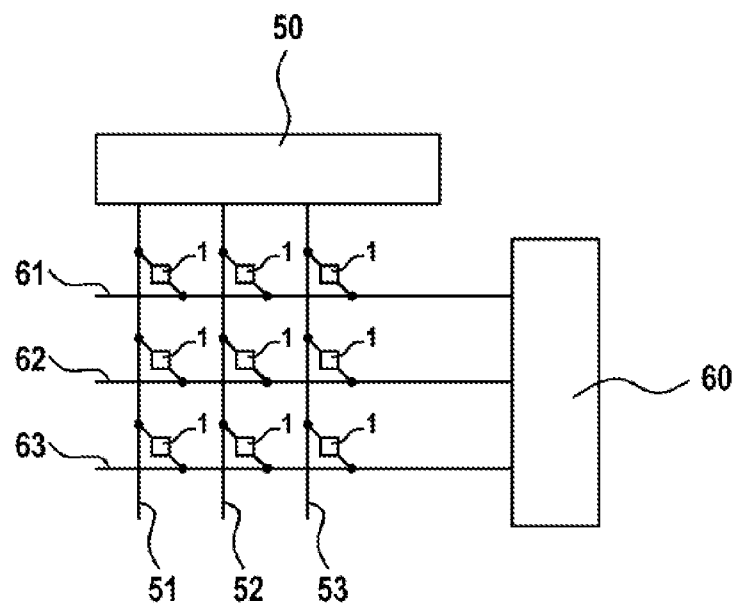
FIG. 3 shows a schematic representation of a sensor array according to one specific embodiment of the present disclosure.

FIG. 3 shows a sensor array for converting from heat radiation into an electrical signal. The sensor array comprises multiple thermal sensors 1 which are associated with a matrix structure made up of multiple rows 61, 62, and 63, and multiple columns 51, 52, and 53. The limitation to three rows and columns is intended only to provide a better view, and does not constitute a limitation of the sensor array. Sensor arrays having more than three rows and/or more than three columns are possible. A thermal sensor 1 is arranged at each intersection of a row 61, 62, 63 with a column 51, 52, 53. One output of the thermal sensor 1 is connected to the control line of the corresponding column 51, 52, or 53. The other output of the thermal sensor is connected to the control line of the corresponding row 61, 62, or 63. Thus, by controlling the corresponding column 51, 52, or 53 via the column control device 50, a corresponding column may be selected. In addition, the row control device 60 selects the corresponding row 61, 62, or 63. Thus, each individual thermal sensor 1 may be individually addressed inside the matrix of the sensor array. Since the diode 30 in the thermal sensor 1 allows a current flow only in one direction and acts in a blocking manner in the other direction, a current flow from one row to another row, or from one column to another column, is not possible through the thermal sensors 1.

By selecting one column 51, 52, or 53 and simultaneously evaluating the signals in all rows 61, 62, and 63 via the row evaluation device 60, a simultaneous evaluation of all output signals of the thermal sensors 1 of an entire column may be carried out. Alternatively, it is also conceivable to control one row via the row control device 60 and subsequently to evaluate all columns 51, 52, and simultaneously via the column control device 50. In both cases, a particularly rapid and efficient evaluation of the entire sensor array is possible.

Such a sensor array for converting from heat radiation into electrical signals may be used in numerous imaging systems. For example, such a sensor array is suitable as a two-dimensional sensor for thermography applications in a thermal imaging camera or the like. Such thermal imaging cameras enable an assessment of building insulation or also for monitoring processes in which the control of temperatures, in particular of temperature differences, is important.

In addition, sensor arrays may also be used in camera systems for night-vision devices. Such night-vision devices enable the detection of the surroundings even in partial or total darkness. In this way, for example, a camera system may be implemented in a motor vehicle, enables an additional evaluation of the surrounding area in darkness due to temperature differences in the surroundings and thus provides information for one or multiple driver assistance systems. In addition, other application cases for the one-dimensional or multidimensional detection of temperature differences are also possible.

Figure 4:
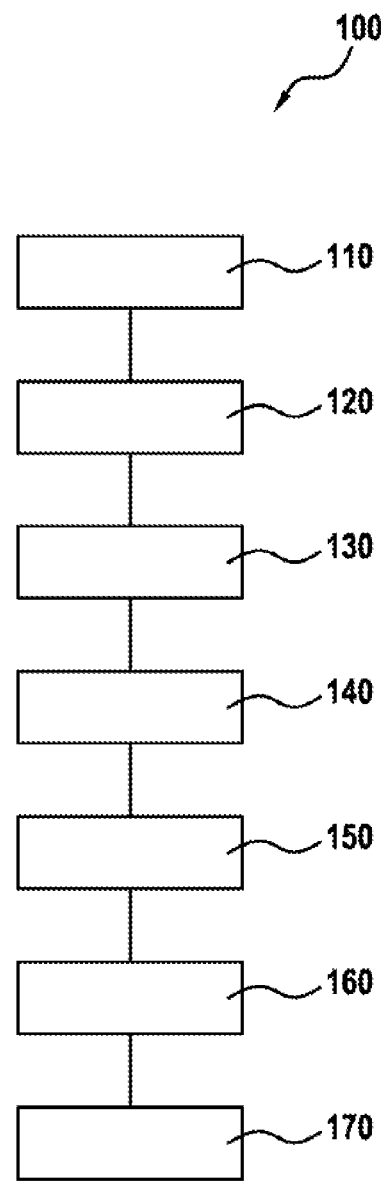
FIG. 4 shows a schematic representation of a method for producing a thermal sensor as based on an additional specific embodiment of the present disclosure.

FIG. 4 shows a schematic representation of a method 100 for producing a thermal sensor which provides a temperature-dependent output signal between a first output A and a second output B. In a first step 110, a field-effect transistor 20 is provided. The FET 20 has a gate terminal G, a source terminal S, and a drain terminal D. In a further step, a diode 30 is provided. This diode 30 is, for example, a p-n diode having two terminals. Furthermore, in step 130, a thermoelectric generator 10 is provided which is designed to provide a temperature-dependent voltage between a first and a second connecting point.

Subsequently, in step 140, a connecting point of the diode 30 is connected to the drain terminal D of the field-effect transistor 20. In step 150, an additional connecting point of the diode 30 is connected to the connecting point of the first output A of the thermal sensor 1. In step 160, the first connecting point of the thermoelectric generator 10 is connected to the gate terminal G of the FET 10. Finally, in step 170, the connecting point of the second output B of the thermoelectric generator 10 is connected to the source terminal S of the FET 20 and the connecting point of the second output B of the thermal sensor 1.

Preferably, the provision of the FET 20 and/or the diode 30 is carried out on a silicon substrate. For this purpose, for designing the FET 20 and the diode 30, corresponding doping is introduced into the silicon substrate.

The provision of the thermoelectric generator 10 is preferably carried out by providing at least two conducting paths made of materials having different Seebeck coefficients. For example, one conducting path may be made up of aluminum, and another conducting path may be made of p-silicon. Other material combinations, for example, n-silicon and p-silicon or the like, are also possible.

In summary, the present disclosure relates to a thermal sensor and a method for producing such a thermal sensor having a low signal-to-noise ratio at a relatively high signal strength. For this purpose, a thermoelectric generator is combined with a field-effect transistor and a diode. Due to its integrated diode and the associated blocking action, the thermal sensor is suitable for an economical and efficient design of imaging sensor arrays for converting heat radiation into electrical signals.

The invention claimed is:

1. A thermal sensor for providing a temperature-dependent output signal between a first output and a second output, the thermal sensor including:
    a field-effect transistor having a gate terminal, a source terminal, and a drain terminal;
    a diode connected to the drain terminal of the field-effect transistor via a first connecting point and connected to the first output of the thermal sensor via a second connecting point; and
    a thermoelectric generator configured to provide a temperature-dependent voltage between a third connecting point and a fourth connecting point, the third connecting point being connected to the gate terminal of the field-effect transistor, the fourth connecting point being connected to the source terminal of the field-effect transistor, and to the second output of the thermal sensor.

2. The thermal sensor as claimed in claim 1, wherein the thermoelectric generator comprises a thermal element including at least two conducting paths made of materials having different Seebeck coefficients.

3. The thermal sensor as claimed in claim 2, wherein the thermoelectric generator comprises a thermal pile including a plurality of thermal elements.

4. The thermal sensor as claimed in claim 1, wherein the field-effect transistor, the third connecting point of the thermoelectric generator, and the fourth connecting point of the thermoelectric generator are arranged on a shared substrate.

5. The thermal sensor as claimed in claim 1, wherein the field-effect transistor, the third connecting point of the thermoelectric generator, the fourth connecting point of the thermoelectric generator, and the diode are arranged on a shared substrate.

6. A sensor array comprising:
a plurality of thermal sensors, the plurality of thermal sensors being arranged in a matrix made up of rows and columns, each thermal sensor of the plurality of thermal sensors being individually addressable, each thermal sensor of the plurality of thermal sensors comprising:
- a field-effect transistor having a gate terminal, a source terminal, and a drain terminal;
- a diode connected to the drain terminal of the field-effect transistor via a first connecting point and connected to the first output of the thermal sensor via a second connecting point; and
- a thermoelectric generator configured to provide a temperature-dependent voltage between a third connecting point and a fourth connecting point, the third connecting point being connected to the gate terminal of the field-effect transistor, the fourth connecting point being connected to the source terminal of the field-effect transistor and to the second output of the thermal sensor.

7. The sensor array as claimed in claim 6, wherein the sensor array is included in a camera.

8. A method for producing a thermal sensor that provides a temperature-dependent output signal between a first output and a second output, the method comprising:
providing a field-effect transistor having a gate terminal, a source terminal, and a drain terminal;
providing a diode having a first connecting point and a second connecting point;
providing a thermoelectric generator configured to provide a temperature-dependent voltage between a third connecting point and a fourth connecting point;
connecting the first connecting point of the diode to the drain terminal of the field-effect transistor;
connecting the second connecting point of the diode to the first output of the thermal sensor;
connecting the third connecting point of the thermoelectric generator to the gate terminal of the field-effect transistor; and
connecting the fourth connecting point of the thermoelectric generator to the source terminal of the field-effect transistor and to the second output of the thermal sensor.

* * * * *